United States Patent
Heisel et al.

[11] Patent Number: 6,059,703
[45] Date of Patent: May 9, 2000

[54] DEVICE WITH AT LEAST ONE MOVEMENT UNIT

[76] Inventors: Uwe Heisel, Robert-Haug-Weg 18, D-70192 Stuttgart, Germany; Martin Gringel, Rotenäckerstrasse 22, D-72459 Albstadt-Lautlingen, Germany

[21] Appl. No.: 09/101,313

[22] PCT Filed: Dec. 18, 1996

[86] PCT No.: PCT/DE96/02443

§ 371 Date: Sep. 23, 1998

§ 102(e) Date: Sep. 23, 1998

[87] PCT Pub. No.: WO97/25180

PCT Pub. Date: Jul. 17, 1997

[30] Foreign Application Priority Data

Jan. 3, 1996 [DE] Germany ............................ 196 00 028
Oct. 2, 1996 [DE] Germany ............................ 196 40 769

[51] Int. Cl.$^7$ ............................. B23Q 3/157; B23Q 5/22; B23C 1/12; B23B 39/00

[52] U.S. Cl. ............................. 483/31; 248/631; 408/234; 409/145; 409/201; 409/216; 409/235; 901/22; 901/23

[58] Field of Search ............................. 483/31, 30; 29/39, 29/50; 409/235, 201, 132, 145, 216, 204, 211, 212; 248/371, 631, 654; 901/41, 8, 28, 29, 22, 21, 23; 408/234, 29, 130; 414/735

[56] References Cited

U.S. PATENT DOCUMENTS

| | | |
|---|---|---|
| 4,988,244 | 1/1991 | Sheldon et al. .......................... 409/132 |
| 5,388,935 | 2/1995 | Sheldon . |
| 5,392,663 | 2/1995 | Charles . |
| 5,401,128 | 3/1995 | Lindem et al. . |
| 5,556,242 | 9/1996 | Sheldon et al. .......................... 409/132 |
| 5,604,593 | 2/1997 | McMurtry ............................ 248/371 X |
| 5,656,905 | 8/1997 | Tsai ........................................ 901/41 X |
| 5,807,044 | 9/1998 | Watari et al. ............................ 409/183 |
| 5,906,461 | 5/1999 | Lunz et al. ............................... 409/201 |

FOREIGN PATENT DOCUMENTS

| | | |
|---|---|---|
| 0202206 | 11/1986 | European Pat. Off. . |
| 0534585 | 3/1993 | European Pat. Off. . |
| 0589565 | 3/1994 | European Pat. Off. . |
| 2083795 | 3/1982 | United Kingdom . |
| 9217313 | 10/1992 | WIPO . |

*Primary Examiner*—William Briggs
*Attorney, Agent, or Firm*—Robert W. Becker & Associates

[57] ABSTRACT

A device for numerically controlled (NC) manufacturing, manipulating and measuring apparatuses has a frame structure with peripheral force introduction locations and at least one movement unit with peripheral force introduction locations. At least three adjusting devices each having a first and a second part are provided. Each adjusting device has a first and a second connecting member positioned at a spacing to the first connecting member. The first parts are connected by the first connecting members to the force introduction locations of the movement unit, wherein these force introduction locations are positioned in a first imaginary coupling plane. The first parts are connected by the second connecting members to the force introduction locations of the frame structure, wherein these force introduction locations are positioned in a first imaginary coupling plane of the frame structure. The second parts are connected by the first connecting members to the movement unit. The first connecting members are positioned in a second imaginary coupling plane of the movement unit. The second parts are connected by the second connecting members to the frame structure, wherein the second connecting members are positioned in a second imaginary coupling plane of the frame structure. At least one second coupling plane has a fixed spacing to the first coupling planes such that the adjusting devices, in standstill positions and during path movement of the movement unit by correspondingly calculated and adjusted lengthening or shortening thereof, are at all times under a defined tension load.

49 Claims, 14 Drawing Sheets

DEVICE WITH AT LEAST ONE MOVEMENT UNIT

BACKGROUND OF THE INVENTION

The invention relates to a device with at least one movement unit having coupled thereto at least three adjusting devices by a respective first connecting member and connected by a respective second connecting member, positioned at a spacing to the respective first connecting member, to a frame structure in a pivotable manner. Due to the first and second connecting members, the adjusting devices are freely pivotable relative to the movement unit and to the frame.

Devices for numerically path-controlled manufacturing apparatus are known which are suitable for the five-axis machining, respectively, positioning of a tool or a measuring device relative to a work piece or to an object in space. Conventional machining concepts, especially for straight movements, have the required constructive features such as Cartesian axis arrangement of advancement components. Modern manufacturing apparatus correspond with respect to their mechanical basic design and their machine kinematics substantially to these proven, highly developed and successfully employed machine concepts. For each degree of freedom of movement of the machine in the x, y, and z directions different constructions of the axis components were constructed and the straight advancement movement was adjusted. Each of these components, in general, has different stiffness as a function of their design and the employed machine and drive elements. Due to the open machine kinematics the yielding, respectively, deformations are additive, caused by all components of the machine within the flow of force so that the total stiffness of the machine is below the stiffness of its weakest mechanical member. This causes in machining devices designed for high stiffness correspondingly large component cross-sections with high moved masses.

A disadvantage of the conventional five-axis machines are the time-consuming and generally manually performed steps for adjusting and aligning during start-up and adjusting of the machine when manufacturing tolerances are surpassed. While errors in the x, y, and z directions for Cartesian machine designs can be compensated control-technologically or by control adjustment, angle deviations (yawing, pitching, rolling) can only be adjusted manually with time-consuming corrective measures of the machine geometry by adjusting or post-machining steps.

This is contrasted by new concepts for manufacturing and measuring devices for positioning a tool or a measuring device relative to a workpiece or object by closed rod linkage kinematics on tripod or hexapod basis (European Patent 0 202 206 B1, respectively, U.S. Pat. No. 5,401,128; WO 92/17313 A1, U.S. Pat. No. 5,388,935; European Patent Application 0 589 565 A2, U.S. Pat. No. 5,392,663; European Patent 0 534 585). The development of hexapodal machines have lead increasingly to manufacturing devices which have considerable disadvantages relative to conventional machining concepts. Examples for this are less expensive manufacture, minimal number of different components, simple mounting, and a geometry development and correction by software. However, this requires a considerable expenditure with respect to controlling and governing, since even for linear movements all axes must be controlled simultaneously. A further disadvantage of currently existing tool, measuring, and mounting apparatus is that a high expenditure with regard to peripheral units is required in order to perform an automatic tool change, respectively, workpiece exchange as well as workpiece supply and workpiece clamping. This results in high apparatus costs.

Hexapodal machines have great degrees of freedom of movement so that complicated tool changing mechanisms are not required and it is instead possible to work with pick up systems.

In the known tripodal and hexapodal machines and manufacturing devices the respective arrangement of the rods which allow movement of a platform relative to a stationary base by changing the length of the participating rods results in a tension/pressure changing load on the rods. This requires a complicated design and precise manufacture of the connecting members which are arranged as coupling elements at the two ends of the rods. In these devices a non-linear stiffness behavior of the device, when load reversal occurs, can be observed. Furthermore, dynamic instabilities of the rods especially under pressure load can be observed. Furthermore, a pretension of the movement unit for adjusting the stiffness is not possible. For employing these new machining concepts in manufacture, high stiffness and linear transmission behavior are the basic requirements for highly precise manufacturing devices and are thus important and, in the end, market-controlling properties.

It is an object of the invention to embody the aforementioned device such that high stiffness and linear transmission behavior is ensured.

SUMMARY OF THE INVENTION

According to the invention, the adjusting devices are at all times under a defined tension load, i.e., in the standstill positions and during path movement of the movement unit with correspondingly calculated and adjusted lengthening or shortening.

In the inventive device the adjusting devices are under defined pulling load by correspondingly calculated and adjusted shortening in the longitudinal direction. The movement unit has thus a highly static and dynamic stiffness as well as a linear path movement behavior since the reversal play has been eliminated in the connecting members. This has a direct effect on the high contour precision of the workpieces to be machined. Furthermore, the mechanical movement system is dynamically adjustable by respectively selecting the pretension in a manner that has not been realized before so that, for example, dynamic instabilities during cutting machining, such as chattering, can be suppressed by changing the pretension. Constructively, substantially simplified connecting members are possible because they are no longer subjected to changing load forces in the main directions. The device can be combined in vertical, horizontal arrangement or in combination of these arrangements to a plurality of machining units so that transfer lines, flexible manufacturing systems (FMS) and manufacturing islands can be produced. Furthermore, manipulating units for mounting and also individual or combined measuring devices can be designed.

The inventive device can be employed for manufacturing, manipulation, handling, as a measuring device etc.

BRIEF DESCRIPTION OF THE DRAWINGS

The invention will be explained in detail with the aid of the embodiments shown in the drawings. It is shown in:

FIG. 15 through

DESCRIPTION OF THE PREFERRED EMBODIMENTS

Figure 1:
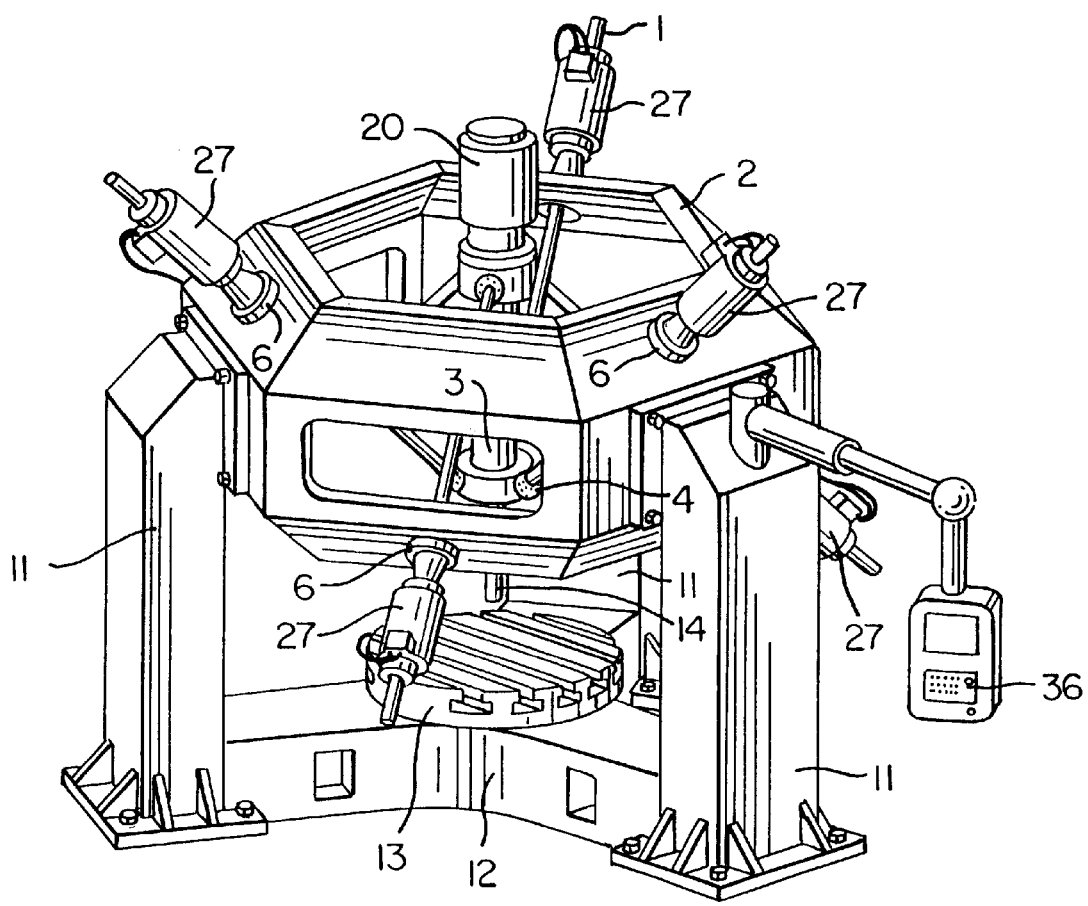
FIG. 1 a perspective representation of an inventive device.

The device according to FIGS. 1 through 4 is embodied as a machine tool. It comprises a frame structure 2 at which adjusting devices 1 are supported by connecting members 6. They are coupled by further connecting members 4 (FIGS. 1 and 2) to a base member 3 forming a movement unit. In the shown embodiment the device has six adjusting devices 1. They are each provided with a respective drive 27. They can be embodied as mechanical, electromechanical, hydraulic, or pneumatic drives with which the adjusting movement of the base member 3 is to be generated as will be explained in the following. The base member 3 is provided with a spindle main drive 20 of a spindle unit with which a tool 14 can be driven. The drives 27 are advantageously connected to a control which can be actuated by an operating key pad 36 (FIG. 1). It is positioned external to the frame structure 2 at a location that is easily accessible.

The frame structure 2 in the embodiment according to FIGS. 1 through 4 is supported by three vertical columns 11 which are anchored on the ground in a suitable manner. The columns 11 are provided at free ends of arms of a support 12. The support has three arms respectively positioned at an angle of 120° to one another and resting on the ground. The column 11 and the support 12 provide a component of the frame structure for the device. On the support 12 a workpiece table 13 is centrally supported.

Figure 2:
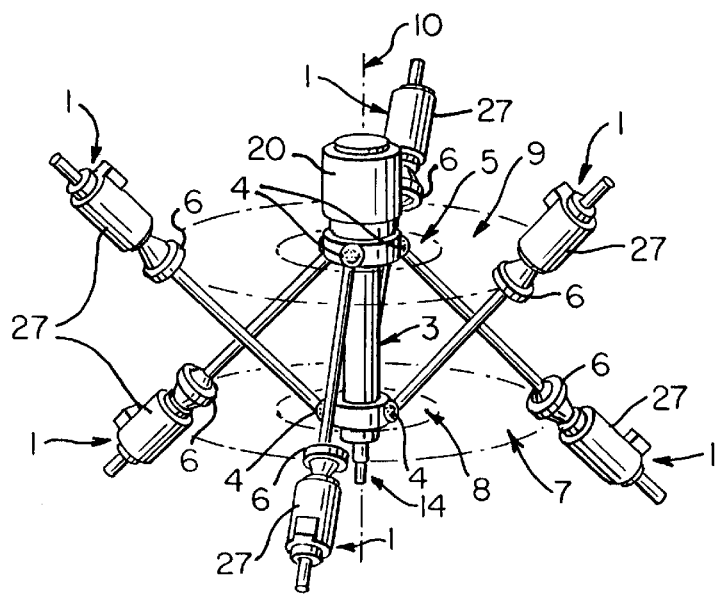
FIG. 2 a perspective representation adjusting devices, connecting members, and a base member of the inventive device according to FIG. 1.
Figure 3:
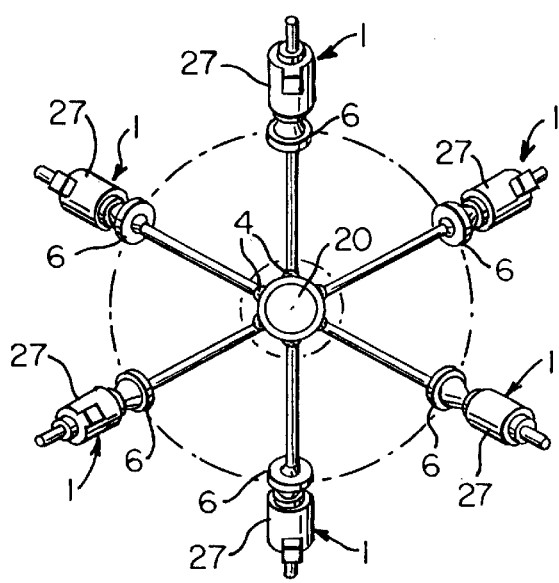
FIG. 3 a plan view onto the adjusting devices, connecting members, and the base member of the inventive device.
Figure 4:
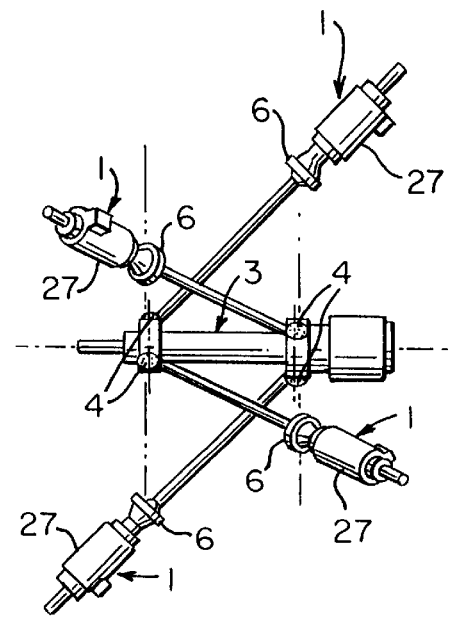
FIG. 4 a side view of the adjusting devices, connecting members, and the base member of the inventive device.

FIG. 2 shows the device without the frame structure 2 and the frame components 11, 12. The adjusting devices 1 are coupled by connecting members 4 at the force introduction locations distributed peripherally at the base member 3. The connecting members 4 can be simple ball elements or U joints. The force introduction locations at the base member 3 define a first imaginary coupling plane 5 of the base member 3. The corresponding adjusting devices 1 extend along the sides of an imaginary tetrahedron to the corresponding connecting members 6 which are provided at the peripherally distributed force introduction locations of the frame structure 2. They define a first imaginary coupling plane 7 of the frame structure 2. These connecting members 6 can also be embodied as simple ball elements or U joints. The connecting members 4 and 6 of the adjusting devices 1 coordinated with the coupling planes 5 and 7 are positioned at a circumferential angle of 120° to one another. These adjusting devices 1 extend, in the representation according to FIG. 2, from their connecting members 4 at a slant downwardly.

The device comprises three further adjusting devices 1 which are coupled by their connecting members 4 also to the peripherally distributed force introduction locations at the base member 3. These force introduction locations define a second imaginary coupling plane 8 of the base member 3. It is arranged at a stationary spacing to the first imaginary coupling plane 5 of the base member 3. These adjusting devices 1 extend along the sides of a further imaginary tetrahedron to the connecting members 6 at the peripherally distributed force introduction locations of the frame structure 2. They define a second imaginary coupling plane 9 of the frame structure 2 which is arranged at a fixed spacing to the first imaginary coupling plane 7. The imaginary second coupling plane 8 of the base member 3 and the second imaginary coupling plate 9 of the frame 2 are rotated by an angle relative to the first coupling planes 5 and 7 about a main axis 10 of the base member 3. This avoids collisions of the adjusting devices 1 with one another, respectively, with the base member 3.

The adjusting devices 1 coordinated with the second imaginary coupling planes 8, 9 extend from their connecting members 4 in the representation according to FIG. 2 at a slant upwardly. The connecting members 4, 6 of these adjusting devices 1 are positioned relative to one another at an angular distance of 120°.

The base member 3 is provided with an integrated (not represented) spindle unit with which the tool 14 is rotatably driven.

Figure 14:
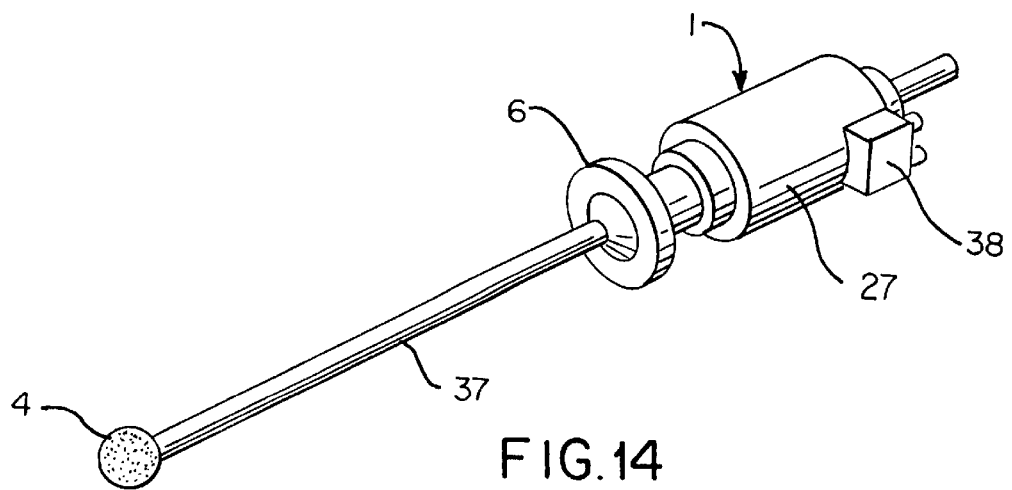
FIG. 14 a connecting member of the inventive device provided with a drive.

As shown in FIG. 1, the adjusting devices are supported at the frame structure 2 such that the drives 27 are arranged outside of the frame structure 2. The base member 3 is positioned in the area within the frame structure 2. The adjusting devices 1 have a respective connecting rod 37 (FIG. 14) which at its free end is connected to the connecting member 4 and is displacable by the drive 27 in its longitudinal direction. The connecting rod 37 extends through the connecting member 6 with which the adjusting device 1 is supported at the frame structure 2. The drive 27 has a connection 38 with which the adjusting device 1 is connected to a control unit. By actuating the drive 27, the connecting rod 37 is moved in the desired direction. Via the control unit in the embodiments according to FIGS. 1 through 4, the adjusting devices 1 are so controlled that the base member 3 is positioned in the desired orientation and position. Via the connecting member 4 each adjusting device 1 is pivotably connected to the base member 3 such that a free pivot movement of the respective adjusting device 1 in relation to the base member 3 is possible. The connecting member 6, which is provided at a spacing from the connecting member 4 and through which the connecting rod 37 of the respective adjusting device 1 extends, allows for a free pivot movement of the respective adjusting device in relation to the frame structure 2. Accordingly, with a respective adjustment of the connecting rods 37 each adjusting device 1 of the base member 3 can be freely pivoted in relation to the frame structure 2.

Coupling of the adjusting devices 1 at the frame structure 2 and at the base member 3 is such that the standstill positions and the path movements of the base member 3 within the frame structure 2 results in the adjusting devices 1, with respectively calculated and adjusted shortening or lengthening in the longitudinal direction, always being subjected to the same defined tension load. These shortenings and extensions are produced in that the connecting rods 37 are moved by the drives 27 in the desired direction relative to the drive 27. Thus, the base member 3 has a high static and dynamic stiffness as well as a linear path movement behavior due to the eliminated axial reversal play in the connecting members 4, 6. In this manner, an optimized machine structure results which allows spatially precise path movements of the base member 3 even under acting load forces. This is true for rotating tools as well as operating devices provided at the base member 3.

With the adjusting devices 1 the base member 3 can be positioned in a certain orientation and position but can also be precisely moved along a desired path. In the embodiment according to FIGS. 1 through 4, six adjusting devices 1 are provided with which the desired movements and positions can be optimally realized. In devices of a simple design it is possible to provide only three adjusting devices 1. During the adjustment of the base member 3, the adjusting devices 1 can be moved in the desired direction relative to the frame structure 2 due to simple connecting members 6 in the form of ball joints or the U joints. The drives 27 of the adjusting devices 1 are fixed relative to the frame 2 in their axial direction but can be pivoted due to the connecting members 6 relative to the frame structure in the required direction.

The correlation of the two coupling planes 5, 8 of the base member 3 and the correlation of the two coupling planes 7, 9 of the frame structure 2 can be constructively designed in any suitable manner so that the stiffness-determining distances are selected according to known construction-systematic solutions. Since the adjusting devices 1 are coupled by their respective connecting members 4 to the force introduction locations of the base member 3 distributed peripherally at an angular distance of 120° and by their connecting members 6 at the force introduction locations peripherally distributed at an angular spacing of 120° at the frame structure 2, the base member 3 can be moved precisely into the desired position, respectively, can be precisely moved along the desired path. This is further positively affected in that the second imaginary coupling planes 8, 9 are rotated relative to the first imaginary coupling planes 5, 7 about an angle of 60° about the main axis 10 of the base member 3.

The adjusting devices 1 can be arranged such that the first and second imaginary coupling planes 7, 9 of the frame structure 2 coincide. Also, the first and second imaginary coupling planes 5, 8 of the base member 3 can coincide. This is the case when the coupling members 4 and 6 of all adjusting devices 1 are positioned respectively in a common plane at the base member 3 and the frame structure 2.

Figure 5:
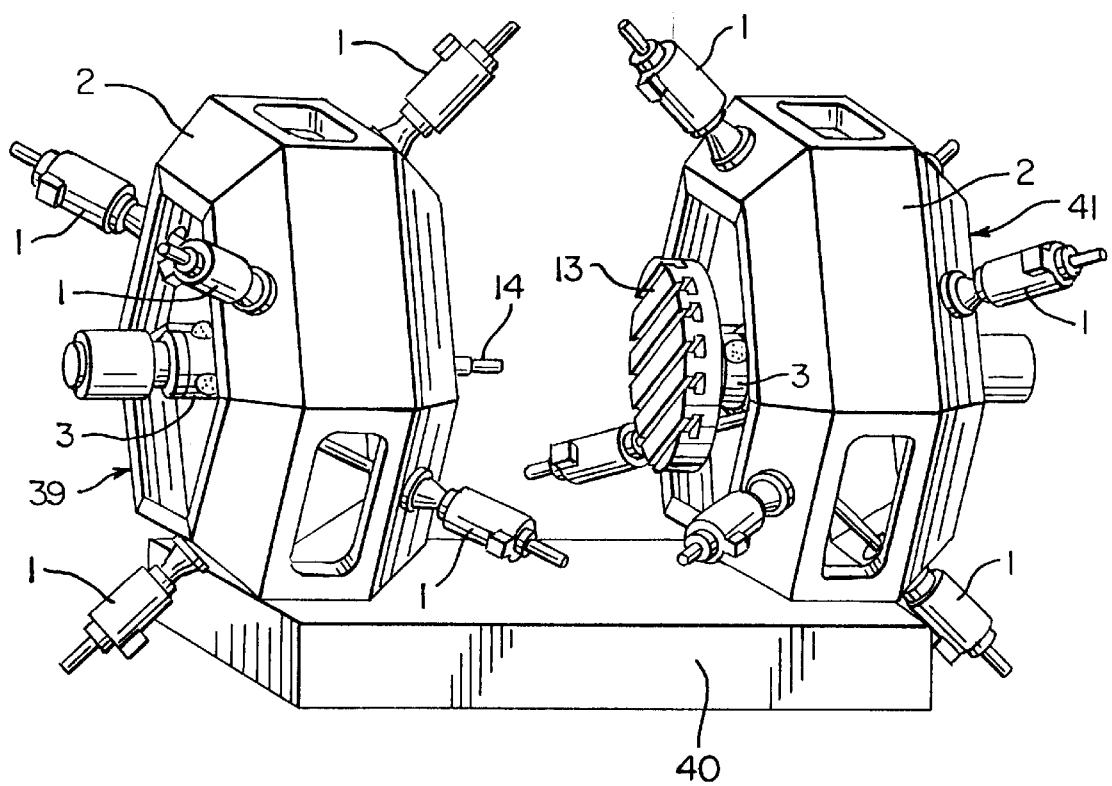
FIG. 5 a perspective representation of two inventive devices, which are embodied as machining and handling units.

FIG. 5 shows the use of two devices as a combined machining and handling device. The machining unit 39 is of the same design as the embodiment according to FIGS. 1 through 4 with the exception of the frame component 11, 12 with the work piece table 13. The frame structure 2, in contrast to the previous embodiment, is arranged vertically on the frame part 40. The tool 14 in its neutral position is thus horizontally arranged.

The manipulation unit 41 also has the frame structure 2 with the adjusting devices 1 and the base member 3. The frame structure 2 is also arranged vertically on the frame component 40. The frame structure 2, the individual adjusting devices 1, and the base member 3 are embodied and arranged as in the embodiment according to FIGS. 1 through 4. At the base member 3 a workpiece table 13 is fastened on which the workpieces to be machined by the tool 14 of the machining unit 39 are arranged. The workpiece table 13 is vertically arranged. The workpiece table 13 can be rotated about the horizontal axis in the desired direction with the aid of the base member 3. The machining and handling units 39, 41 operate in the same manner as has been explained in context with FIGS. 1 through 4. The adjusting device 1 is under a defined tension load so that the base member 3 of the two units has a high static and dynamic stiffness. During machining of the workpiece, the workpiece table 13 and/or the tool 14 can be adjusted by the corresponding base member 3 into the desired orientation or position and/or can be moved on a path that is necessary for machining the workpiece. The two units 39, 41 can be arranged on the frame component 40 at such a spacing that the movements of the two base members 3 of the two units 39, 41 are sufficient in order to machine the workpiece in the desired manner. It is furthermore possible to move the machining unit 39 and/or the handling unit 41 on the frame component 40 in the z direction so that the spacing between the two units 39, 41 can be changed. In the shown embodiment, the tool 14 is rotatably driven about its axis and can be, for example, a milling cutter, a drill etc. The base member 3 is provided with a respective receiving element for receiving the tool 14 which is rotatably driven by the spindle main drive 20.

Figure 6:
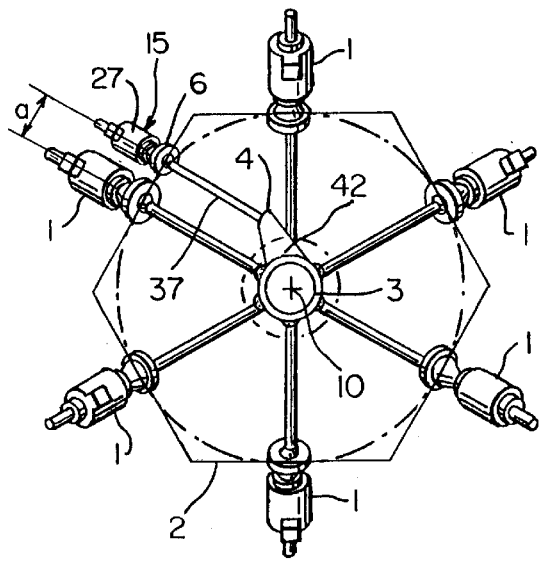
FIG. 6 and FIG. 7 a representation corresponding to FIG. 3 and FIG. 4 of a second embodiment of the inventive device.
Figure 7:
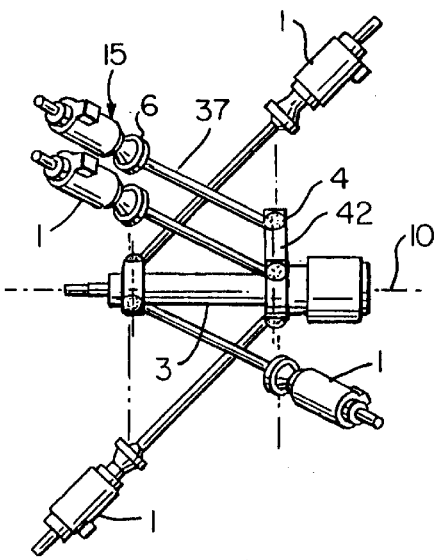

FIGS. 6 and 7 show an embodiment in which the torque occurring during machining and/or handling of the workpiece can be supported at the base member 3. For this purpose, the base member 3 is provided with an arm 42 which extends transversely, preferably perpendicularly, to the main axis 10 of the base member 3. At the free end of the arm 42 an additional adjusting device 15 is connected by coupling member 4 which is identically embodied as the adjusting device 1. The adjusting device 15 is connected by connecting members 6 to the frame structure 2, which is shown only schematically in FIG. 6. The coupling members 4, 6 of the adjusting device 15 can be simple ball joints or U joints. The adjusting device 15 comprises a drive 27 which is supported at the frame structure 2 and with which the connecting rod 37 can be moved in its longitudinal direction. As can be seen in FIG. 7, the connecting members 4 of the adjusting device 15 as well as of the corresponding adjusting devices 1 are positioned in a common plane. The additional adjusting device 15 has, in the axial direction of the base member 3, (FIG. 6), a spacing a from the neighboring adjusting device 1. The additional adjusting device 15 is connected to the control unit and is actuated together with the adjusting devices 1 during use of the device such that the torque acting on the base member 3 during machining is compensated. Accordingly, a workpiece can, for example, be machined with high precision.

Figure 8:
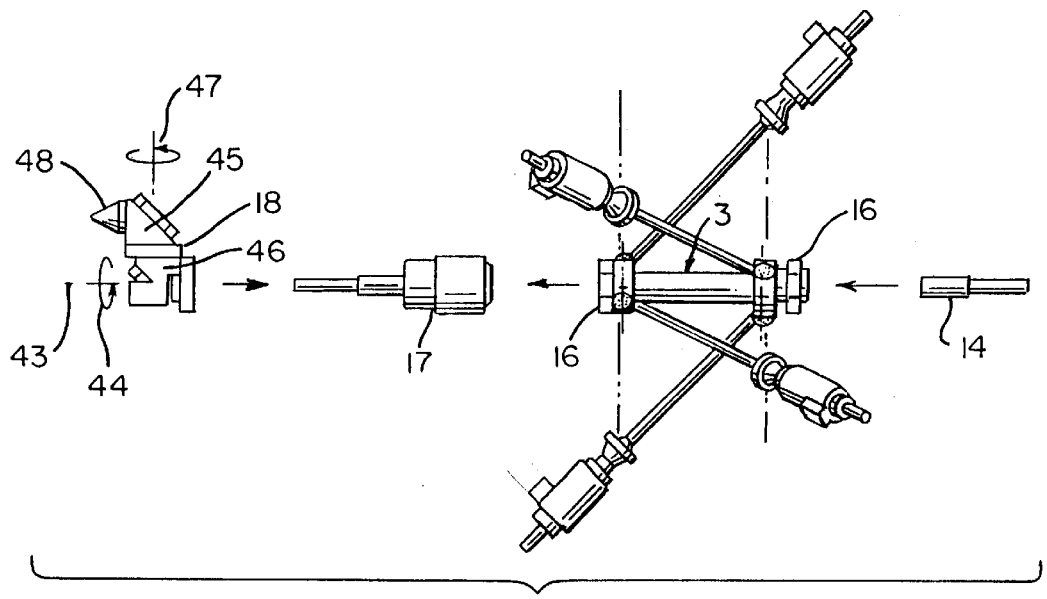
FIG. 8 a side view of the inventive device according to FIGS. 1 through 4, having a base member with interfaces for tools.

FIG. 8 shows the possibility to provide at the base member 3 interfaces 16 to which the tools 14 or operating devices 17 as well as further units 18 can be connected. The interfaces 16 in the shown embodiment are provided at the two ends of the elongate base member 3. To the righthand interface 16 of FIG. 8 the tool 14 is connected and rotatably driven by the non-represented integrated spindle drive about its axis. The left interface 16 of FIG. 8 is connected to the operating device 17 which is pushed onto the axis unit 18. It can be rotated by the operating device 17 about a horizontal axis 43 (arrow 44). The axis unit 18 is provided with a head piece 45 which is rotatable relative to the base member 46 of the axis unit 18 about a vertical axis 47 shown in FIG. 8. The two rotary axis 43, 47 of the unit 18 are thus positioned perpendicularly to one another. At the end face of the head piece 45 a tool 48 is provided. The manufacturing device according to FIG. 8 is otherwise of the same design as the embodiment according to FIGS. 1 through 4. The base member 3 can also include a torque support according to the embodiment of FIGS. 6 and 7.

Figure 9:
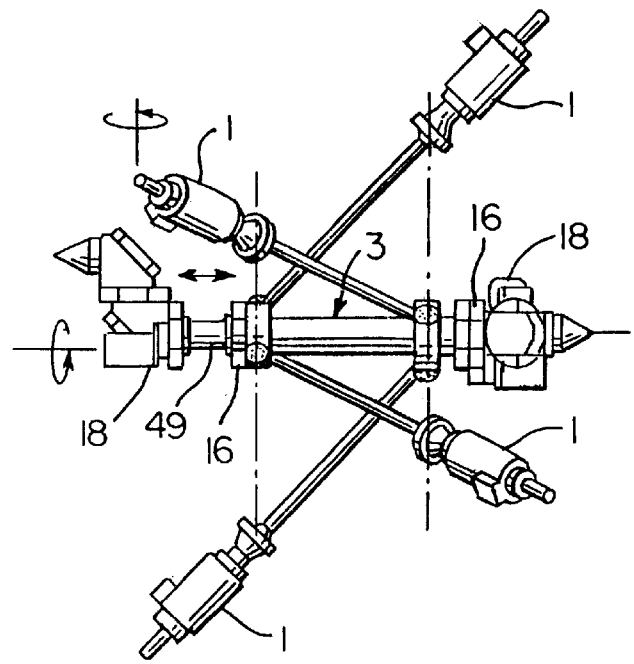
FIG. 9 a side view of the adjusting devices, connecting members, and the base member of a further embodiment of the inventive device.
Figure 10:
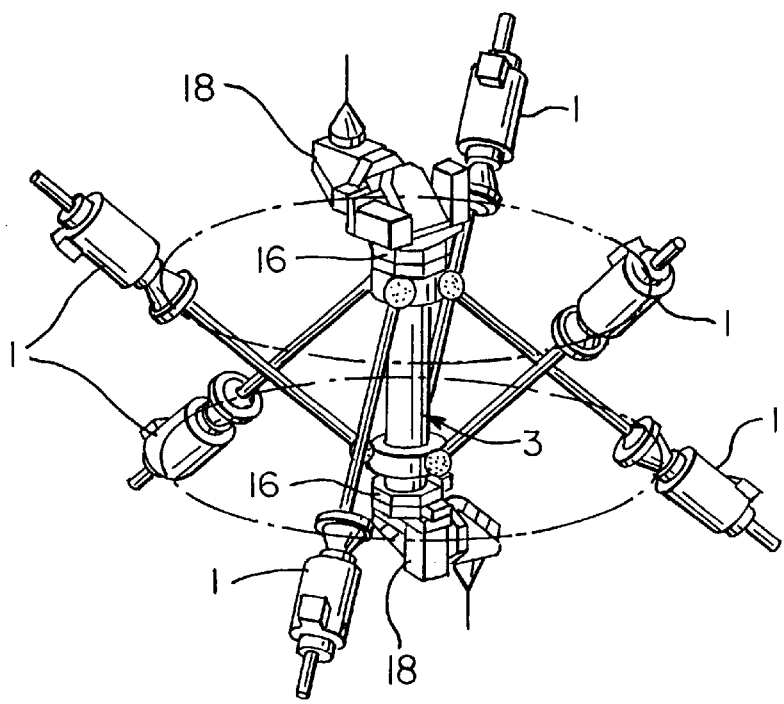
FIG. 10 the device according to FIG. 9 in a perspective representation.

The FIGS. 9 and 10 show an embodiment in which the two interfaces 16 of the base body 3 are connected to a respective unit 18. The units 18 are identical to the embodiment of FIG. 8, but can also have any other suitable embodiment. The left unit 18 shown in FIG. 9 is positioned on a rod 49 which is movably supported at the base member 3. The unit 18 can thus also be moved in the axial direction of the base member 3. The corresponding displacement drive is integrated into the base member 3 and advantageously connected to the control units for the adjusting devices 1. This is also true for the drive of the other unit 18. Otherwise, the embodiment according to FIGS. 9 and 10 is identical to the embodiment according to FIGS. 1 through 4. It is also possible to provide a torque support for the base member 3 according to the embodiment of to FIGS. 6 and 7.

Figure 11:
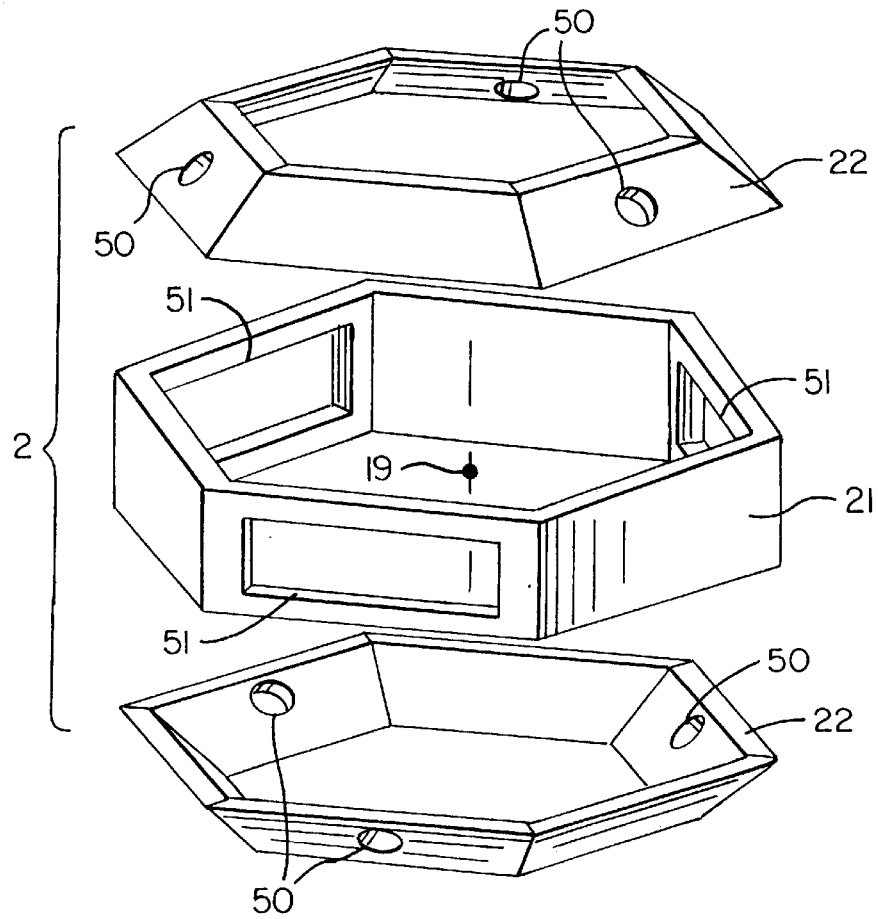
FIG. 11 an exploded view of a frame structure of the inventive device.
Figure 12:
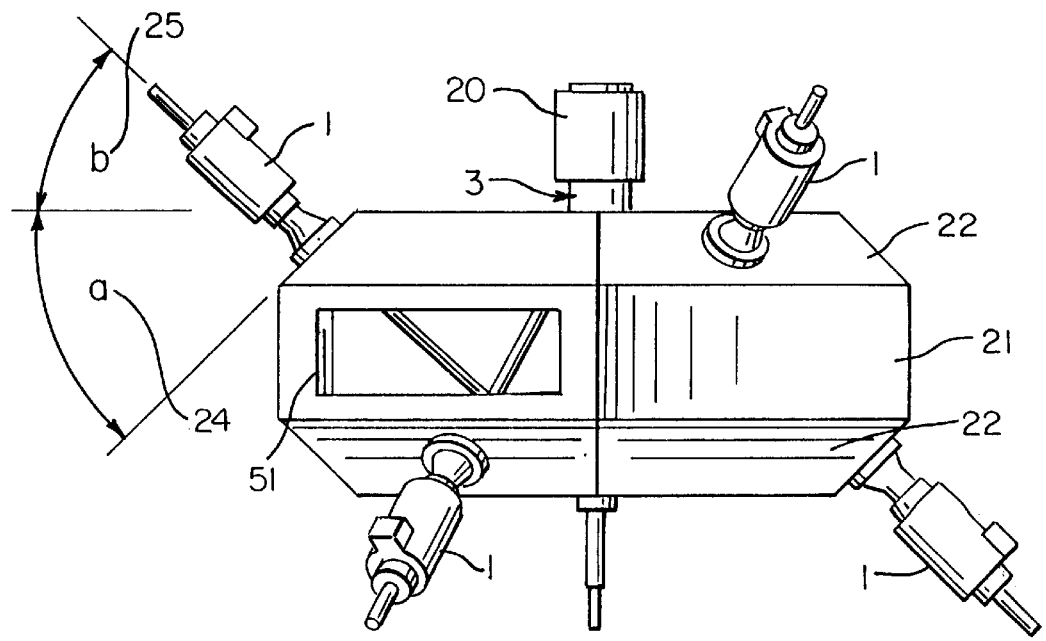
FIG. 12 the frame structure according to FIG. 11 in the mounted state as a part of the inventive device.

The FIGS. 11 and 12 show in detail the design of the frame structure 2. It delimits an interior space 19, which, according to FIG. 11, has a hexagonal cross-section. In the interior space 19 at least a portion of the base member 3 is housed. A spindle main drive 20 extends past the frame structure 2 (FIG. 12). The frame structure 2 has a centrally arranged frame part 21 which is in the form of a regular hexagon. This frame part 21 can also have any other regular polygonal cross-section. The walls of the frame part 21 in the shown embodiment are positioned at an angle of 60° to one another. The interior space delimited by the frame part 21 has a constant cross-section over the height of the frame part 21.

At the end faces of the central frame part 21 two frame parts 22 are connected which also have a hexagonal cross-section. The walls of the frame parts 22 extend from the centrally arranged frame part 21 in a converging manner. Thus, the inner cross-section of the frame parts 22 is continuously reduced in a direction away from the centrally arranged frame part 21. In these external frame parts 22 the individual adjusting devices 1, 14 with their respective connecting members 6 are supported. The angle of slant 24 of the walls of the frame parts 22 is oriented according to the spatial angles 25 that the adjusting devices 1 have in the neutral position of the base member 3. The frame parts 22 have at their side walls through openings 50 through which the adjusting devices 1 extend into the interior space 19 of the frame 2. The through openings 50 are provided in the respectively alternating walls of the frame parts 22.

The centrally arranged frame part 21 has in the respectively alternating walls openings 51 through which the interior space 19 of the frame structure 2 can be viewed from the exterior.

The frame parts 21, 22 can also have any other cross-sectional embodiment so that the respective device can be adjusted to respective requirements, especially the number of adjusting devices 1.

Figure 13:
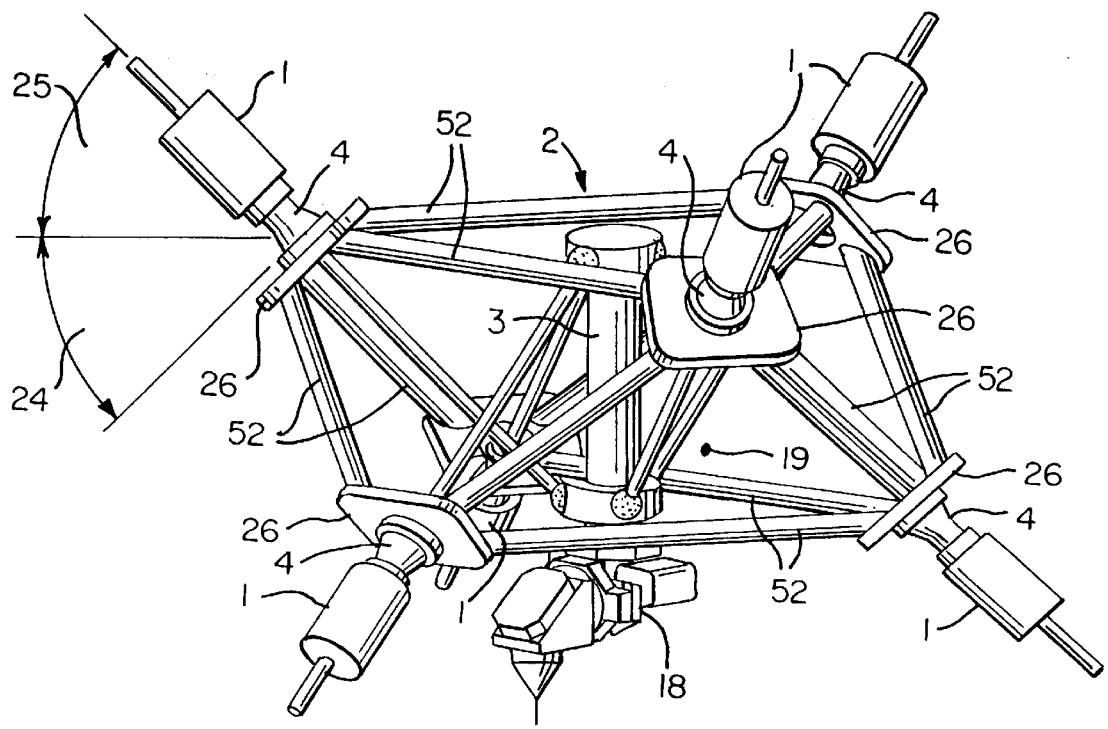
FIG. 13 a further embodiment of the inventive device.

FIG. 13 shows an embodiment in which the frame structure 2 is formed by individual rods 52 which connect the frame elements 26 to one another at which the adjusting devices 1 are supported. The frame elements 26 are plate-shaped and serve for receiving the connecting members 4 of the adjusting devices 1. The stays 52 delimit the interior space 19 of the frame 2 in which the base member 3 is arranged and on which the adjusting devices 1 are connected in the manner disclosed above. A unit 18 is connected to the lower end of the base member 3 as shown in FIG. 13. Due to the rods 52 and the plate-shaped frame elements 26 the frame structure 2 has only minimal weight. However, it exhibits a high stiffness. The device operates otherwise in the manner of the embodiment according to FIGS. 1 through 4. The frame elements 26, as described with the aid of FIGS. 11 and 12 for the frame part 22, are positioned at a slant angle 24 to the horizontal plane. This slant angle is determined by the spatial angles 25 which the adjusting devices 1 have in their neutral position of the base member 1 relative to the horizontal plane. Accordingly, the same conditions as in the embodiment according to FIGS. 11 and 12 are present.

In the described and disclosed embodiments the device is stationary. However, it is possible to embody the device so as to be mobile. For example, the device can be a machining device that is non-stationary and can be used in a manufacturing environment. The device in this case is provided with respective interface locations. For example, the embodiment according to FIG. 13 with its special design of the frame structure 2 could be advantageous as a mobile device.

In all disclosed and still to be disclosed embodiments the adjusting devices 1 for transmitting the pulling forces are provided with moment-free connecting members 4, 6. With the drive 27 the respective connecting rods 37 of the adjusting devices 1 are moved into the desired direction.

Figure 15:
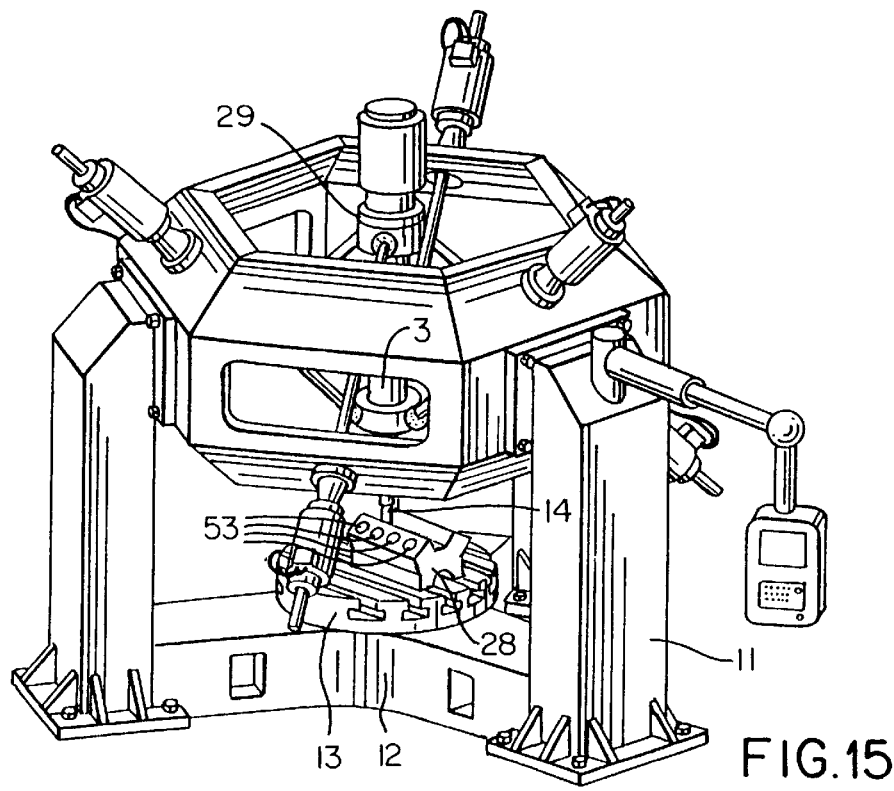

FIG. 15 shows the device as a part of a machine tool in which workpieces 28 are machined by tool 14. The workpiece 28 is clamped in a manner known per se on the workpiece table 13. The tool 14 is a drill with which, for example, adjacently positioned bores 53 are machined into the workpiece 28. The device corresponds to the embodiment of FIG. 1. The tool 14 is received in a spindle unit 29 which is provided at the base member 3. The spindle unit 29 drives the tool 14 in a rotating manner. Depending on the required machining at the workpiece 28 it is also possible to employ other tools 14.

Figure 16:
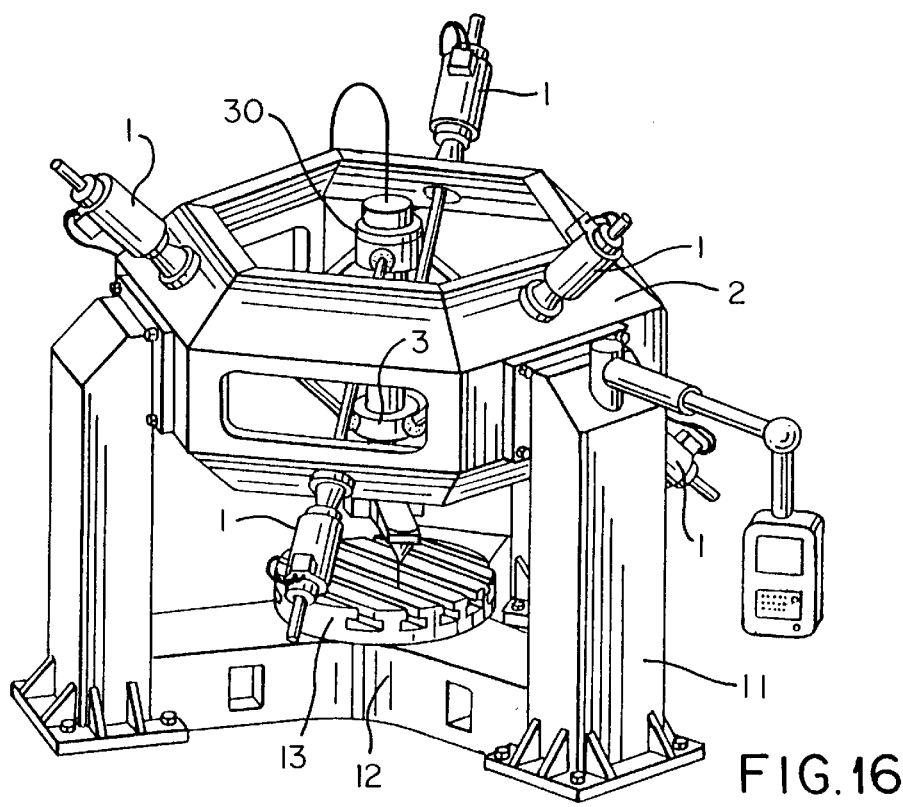

In the embodiment according to FIG. 16, which is embodied identical to the embodiment of FIG. 15 with the exception of differences to be disclosed below, the base member 3 has a beam guiding device 30 with which an energy-rich beam, especially a laser beam, can be positioned relative to a workpiece. The workpiece to be machined by the energy-rich beam is clamped onto the workpiece table 13 which is arranged on the support 12. The represented embodiment is thus a beam guiding machine with which the energy-rich beam can be positioned relative to the workpiece. Since the base member 3 with the adjusting devices 1 can be adjusted in the described manner into different orientations and positions and can also be moved along movement paths, the workpiece can be machined in the required precise manner by the energy-rich beam.

In the embodiment according to FIG. 7, the device is a portion of a manipulating device with which, for example, mounting, coating, combining and separating techniques, handling, loading, etc. can be performed. At the base member 3 in this situation a manipulation unit 31 for the non-represented object received on the table 13 is provided. The table 13 in this case is an object support table which receives the respective object. Otherwise, this device is identical to the embodiment according to FIGS. 1 through 4. The frame structure 2 of the device is fastened at the upper end of the vertical column 11 in the manner disclosed. The manipulator unit 31 can be moved by the base member 3 and the adjusting devices 1 by the required amount.

Figure 17:
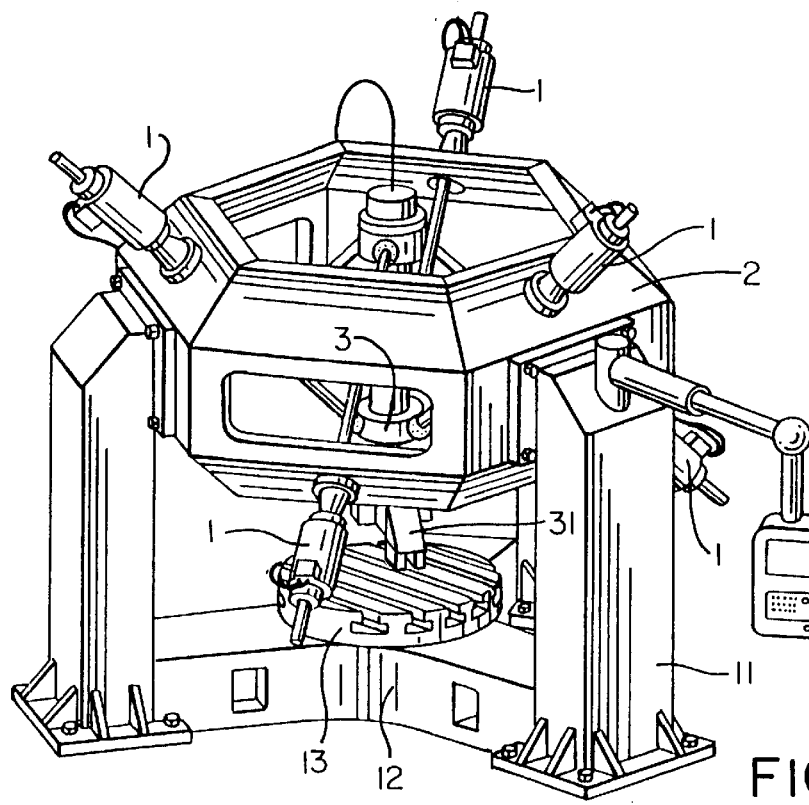
Figure 18:
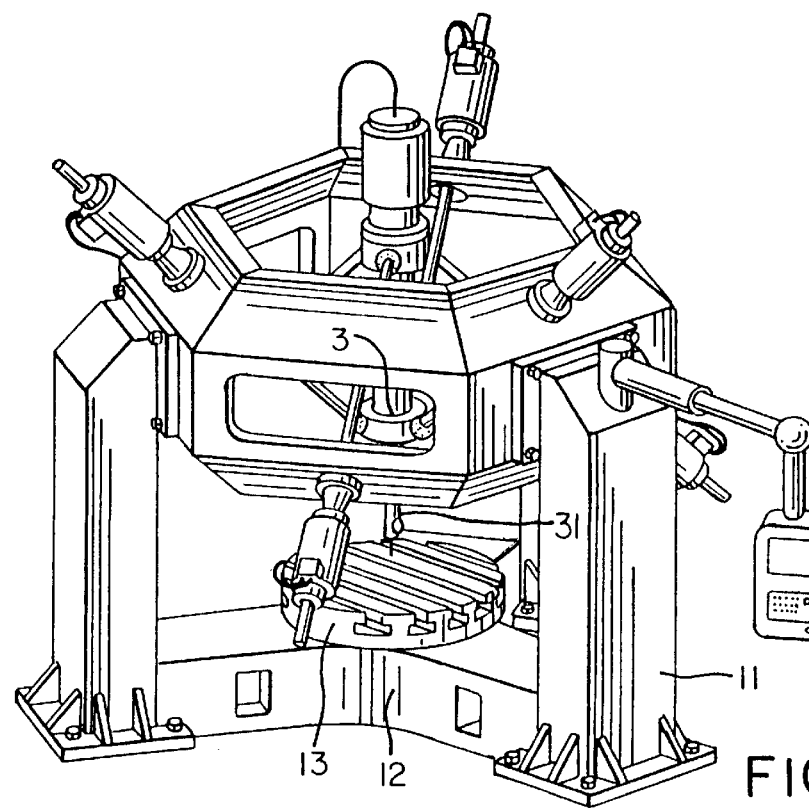
Figure 19:
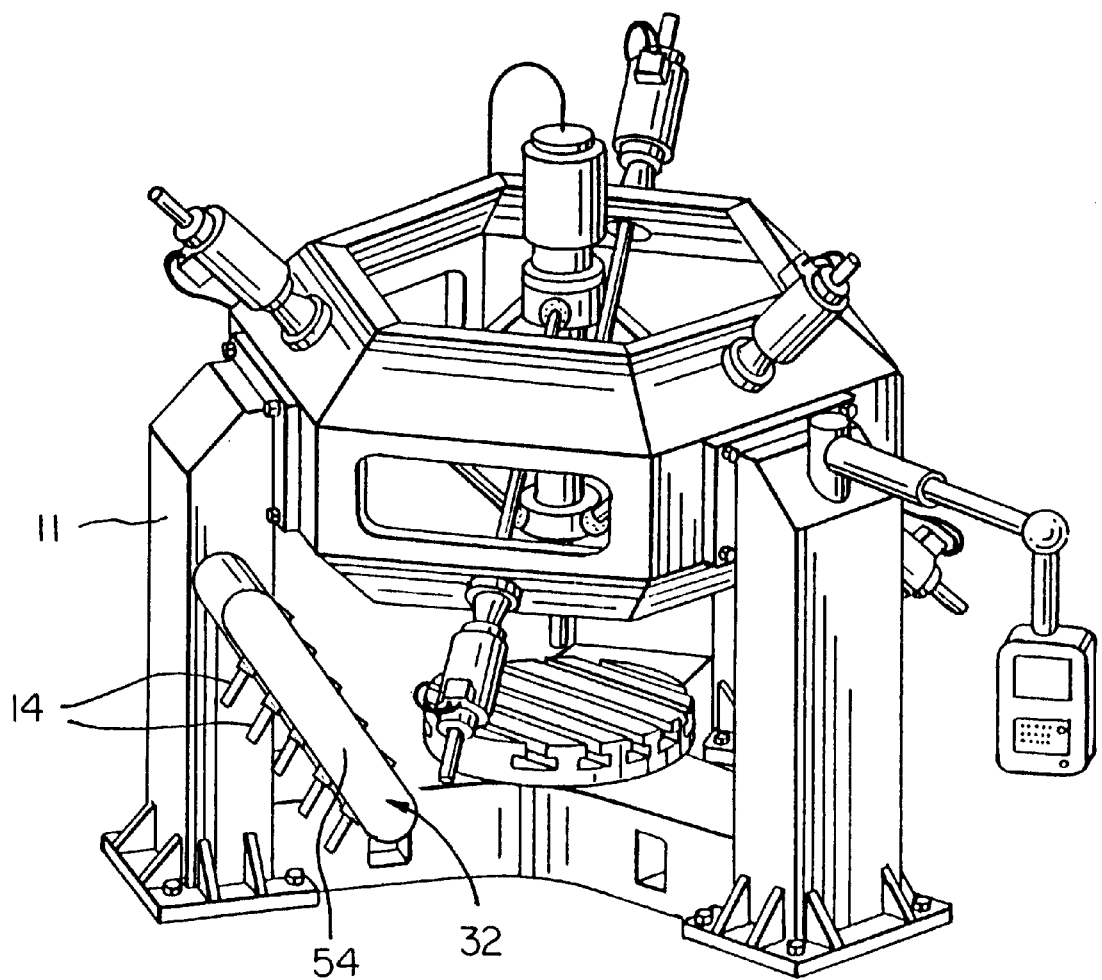

FIG. 18 shows a further use of the device. At the lower end of the base member 3 a manipulating unit 31 of a different kind as in the previously disclosed embodiment is arranged. Otherwise, this embodiment is identical to the embodiment of FIG. 17. FIG. 19 shows the possibility to provide at a machine, which includes the device according to FIG. 1 through 4, a tool changing system 32. It is arranged at a vertical stand 11 and has a magazine 54 in which the tools 14 are stored. The magazine 54 can also contain machining heads and/or measuring tools in addition to or instead of the tools 14. The tool changing system 32 can be embodied passively or actively. In a passive tool changing system 32 the tools 14, the machining heads, and/or measuring tools are removed from the magazine 54 by the device itself, respectively, are placed into the magazine by the device. When the tool changing system is of an active design, it includes a tool changer with which the tools 14, the machining heads, and/or measuring tools are removed from the magazine 54 and fastened to the base member 3 in a suitable manner. Since such active or passive tool changing systems are known per se, they are not disclosed in detail in this context. Such a tool changing system 32 can also be provided in the previously disclosed embodiments and in other embodiments to be disclosed in the following. With the tool changing system 32 an automated changing of the tool 14, the machining heads and/or measuring tools is possible.

Figure 20:
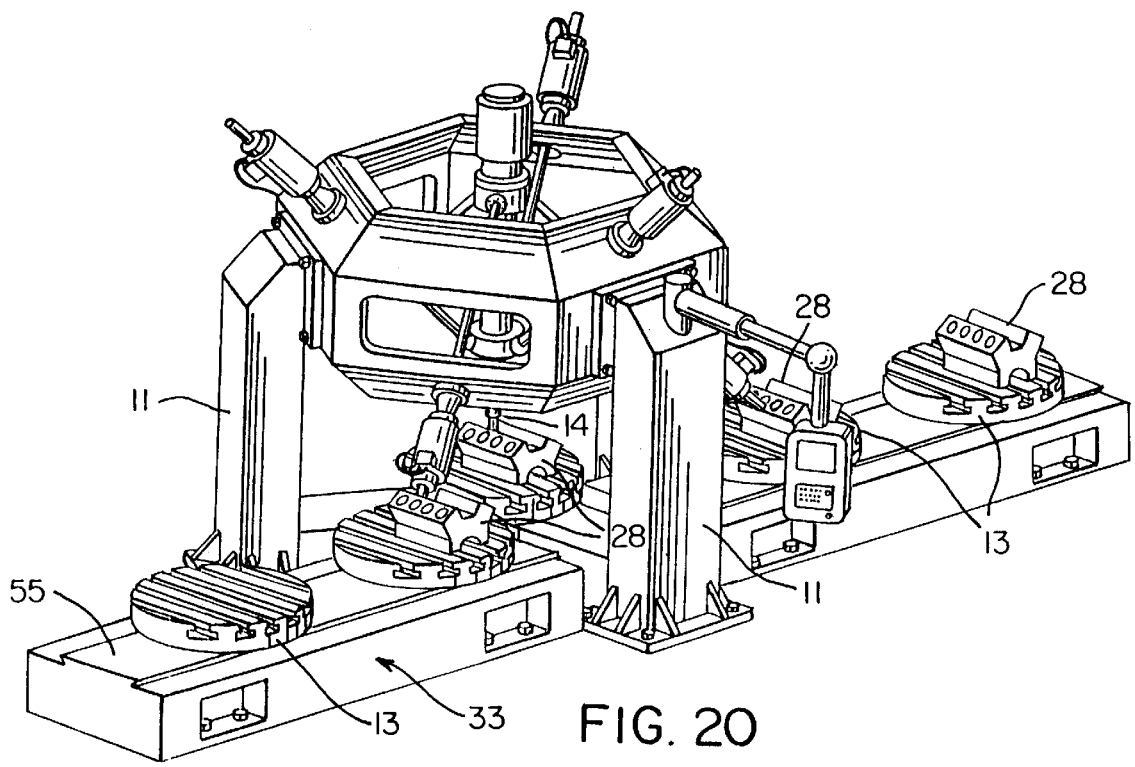

FIG. 20 shows an embodiment in which the workpieces 28 are automatically supplied to the machine where they are to be machined by the tool 14 of the device. The workpieces 28 are clamped onto the workpiece table 13 which are transported on a transport system 33. The transport system 33 is mounted onto the ground in a manner known per se and is embodied as is known in the prior art. It comprises a transport path 55 on which the workpiece table 13 are transported. The transport system 33, respectively, the transport path 55 extend through the machine so that the workpieces 28 can enter the working area of the tool 14, respectively, of the device. For machining the workpiece 28, the respective workpiece tables 13 can be moved transversely to the transporting direction, should this be required for machining the workpieces 28 by the tool 14. The vertical column 11 of the machine are positioned on both sides of the transport system 33. Along the transport path 55 further machines with respective devices can be provided so that the workpieces 28 can be machined and/or manipulated accordingly by the different machines. The machine of the shown embodiment is identical to the embodiment according to FIGS. 1 through 4, but can also have a design according to the other figures.

Figure 21:
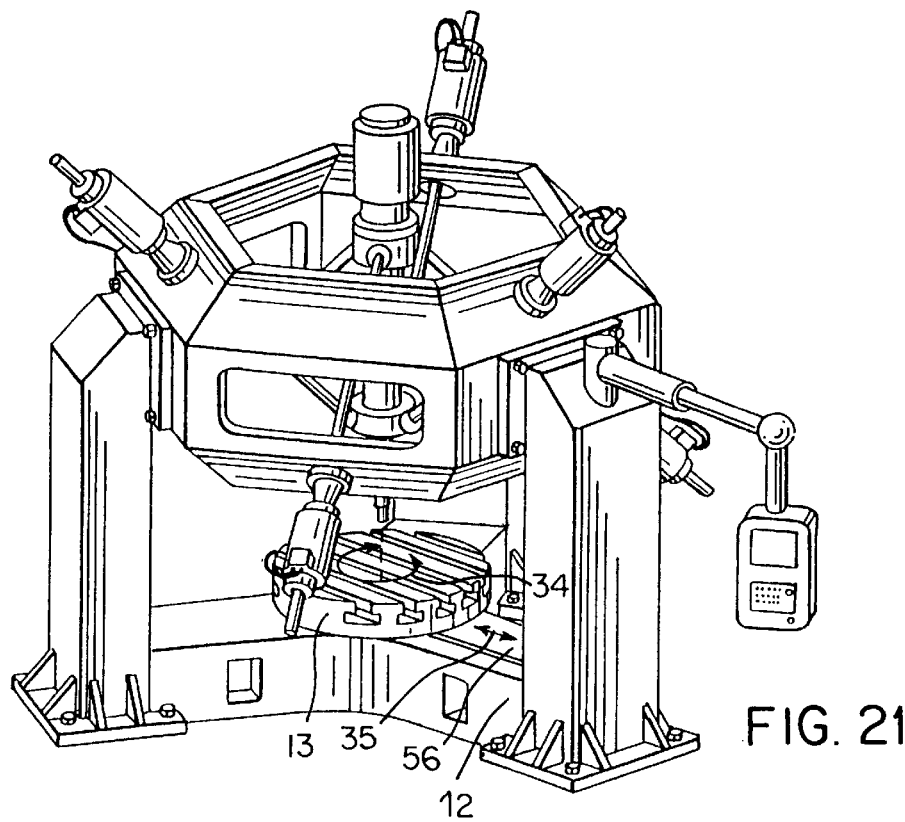

FIG. 21 shows the possibility to rotate the workpiece table 13 about a vertical axis 34. In addition, the workpiece table 13 can be moved in the direction of arrow 35. The movement axes 34, 35 are NC axes which allow for a precise positioning of the workpiece table 13. The workpiece table 13 can also have an integrated vertical rotary axis. The workpiece table 13 can then be rotated only about the integrated axis 34. It is however also possible to provide further NC axes in order to machine the workpiece clamped on the workpiece table 13 in the desired fashion. For moving the workpiece table 13 in the direction 35, one arm of the support 12 is provided at its upper side with a corresponding slide guide 56 for the workpiece table 13. Otherwise, the machine is of the same design as the example of FIGS. 1 through 4. Of course, the machine can also be embodied according to the embodiments of the other represented and discussed figures.

The disclosed machining devices can be arranged relative to the main axis 10 of the base member 3 horizontally, vertically, as well as in any other intermediate position. In the embodiment according to FIGS. 1 through 4, 12, 13, and 15 through 21, the main axis 10 in the neutral position of the base member 3 is respectively vertically arranged so that the frame structure 2 of the devices are horizontally positioned. In the embodiment according to FIG. 5, the main axes 10 of the two base members 3 are horizontal in their neutral position so that the frame structures 2 are respectively vertically arranged. In the embodiment according to FIG. 22 three devices are provided which are of identical design as the embodiments of FIGS. 1 through 4. The frame structures 2 of the three devices are connected by intermediate frames 57 to one another such that two oppositely arranged frame structures 2 extend vertically and the upper frame structure 2 extends horizontally. All frame structures 2 have a common vertical plane. In the neutral position of the base member 3 of the device the main axes 10 are positioned in this vertical plane. The main axes 10 of the oppositely arranged devices are aligned with one another and horizontal, while the main axis 10 of the other device extends perpendicularly thereto. Neighboring frame structures 2 are positioned in the shown embodiment perpendicularly to one another. The intermediate frame 57 are positioned in this case respectively at an angle of 45° to the respective frame structures 2. The intermediate frames 57 are connected to the centrally arranged frame part 21 of the frame structures 2. The machine is supported on the ground by a frame 58 on which the workpiece table 13 is arranged. The two vertical frame structures 2 are connected by a respective intermediate frame 57 to the frame 58. Since each device has a driven tool 14, the workpiece positioned on the workpiece table 13 can be machined, for example, on three sides by the tools 14. The base member 3 of the three devices can be controlled independent of one another so that the three tools 14 can respectively perform different machining steps and/or movements at the same time. The devices in the shown embodiment are identical as in the embodiment according to FIGS. 1 through 4. Devices can also be embodied as shown in the other figures.

Figure 22:
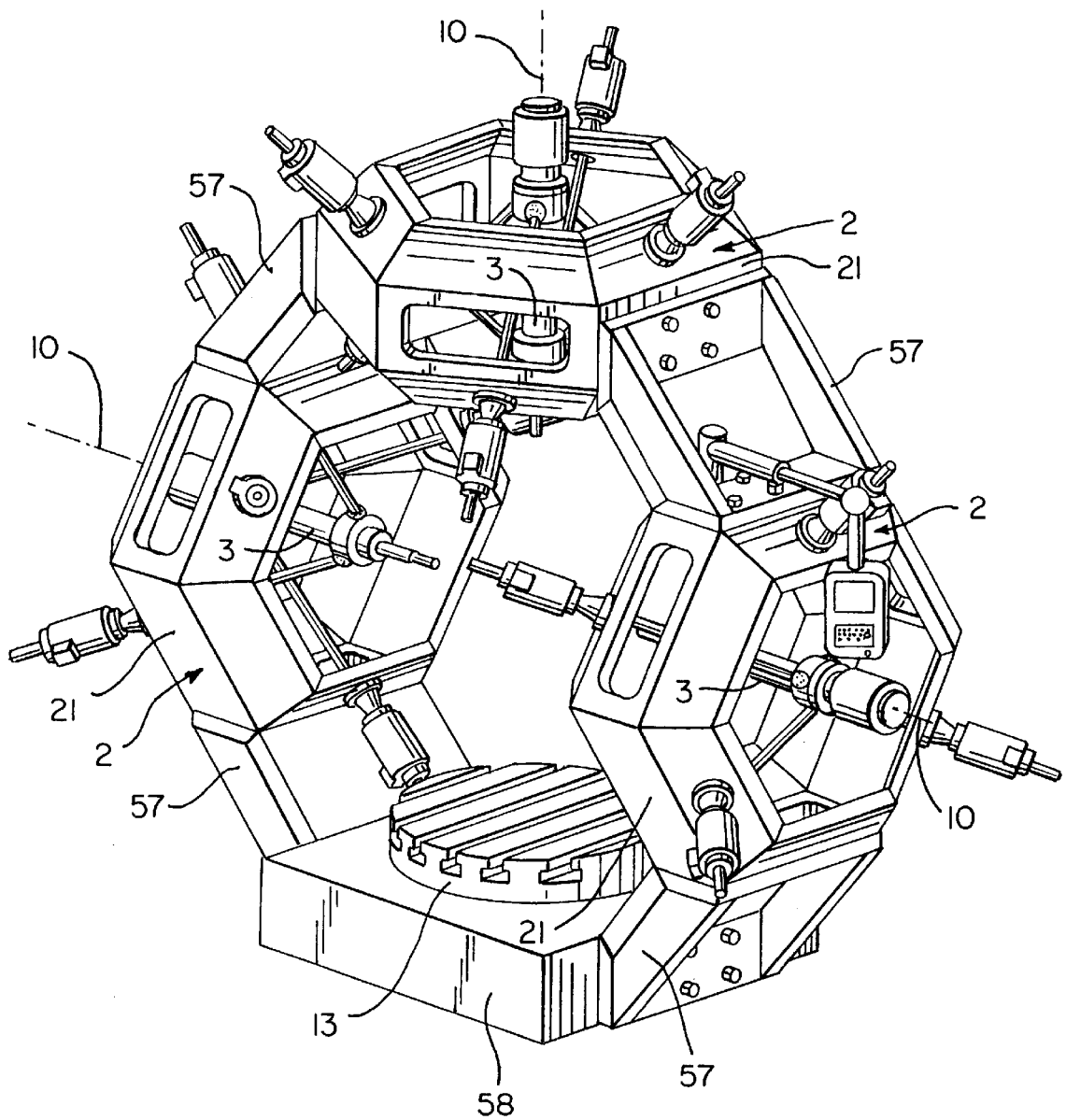
Figure 23:
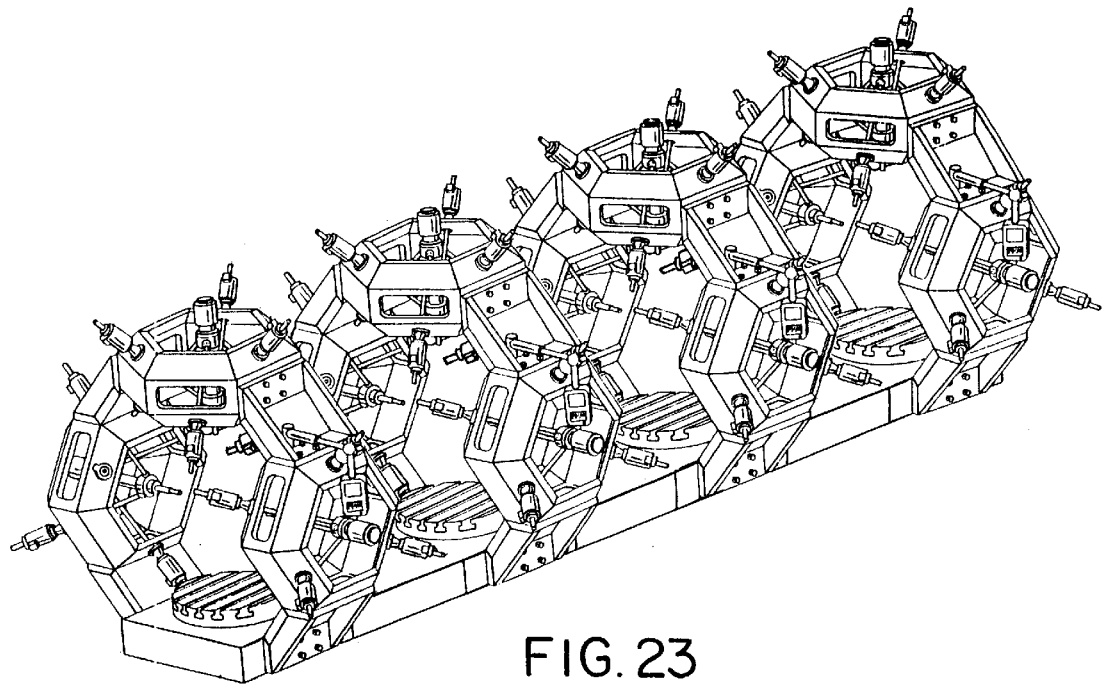
FIG. 23 further embodiments of the inventive device.

FIG. 23 shows the possibility to arrange a plurality of machines according to FIG. 22 horizontally adjacent to one another. In the shown embodiment four such machines are arranged one after another. While the machine according to FIG. 22 is an individual machine, at least two, in the shown embodiment four, such machines can be used and employed as a manufacturing line or manufacturing area. The individual machines can be operated in an interconnecting manner or as standalone machines. These machines can also be transfer systems or stepped or continuous systems. It is also possible to embody these machines as flexible manufacturing systems (FMS).

The machines represented in FIGS. 22 and 23 can be arranged so as to be horizontally and/or vertically or oppositely arranged with respect to their respective spatial orientation. FIGS. 22 and 23 show only one embodiment in this respect.

Figure 24:
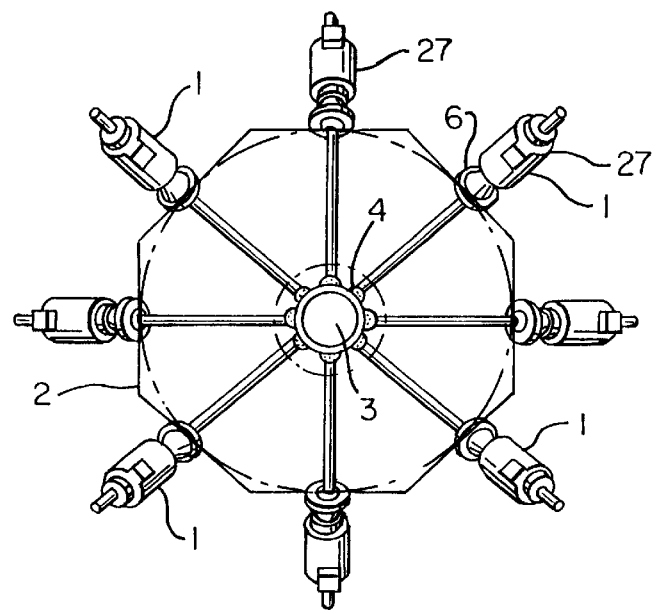
FIG. 24 a plan view of a further embodiment of the inventive device.

In the embodiment according to FIG. 24 more than three adjusting devices 1 are coupled by their connecting members 4 to the force introducing locations peripherally distributed at the base member 3. The adjusting devices 1 are also coupled by the connecting members 6 to the peripherally arranged force introducing locations at the frame structure 2 which is represented only schematically. In contrast to the previous embodiments, the frame structure 2 has the shape of a regular octagon. Eight adjusting devices 1 are provided which extend along the sides of the imaginary multi-sided pyramids shaped body. Beginning at the drives 27, four adjusting devices 1 in the neutral position extend at a slant downwardly relative to the base member 3, and the other four adjusting devices extend at a slant upwardly from the drive 27. This positioning of the individual devices 1 is relative to the horizontal position of the frame structure 2. Otherwise, the device according to FIG. 24 is identical to the embodiment according to FIGS. 1 through 4. Of course, the device according to FIG. 24 can also have a design as has been disclosed with other embodiments. The frame structure 2 has, with the exception of the octagon shape, advantageously an embodiment as disclosed in regard to FIGS. 11 and 12.

The devices are used as manufacturing and manipulation devices. As has been explained in regard to FIG. 16 in an exemplary manner, the device can also be used as a measuring device.

Figure 25:
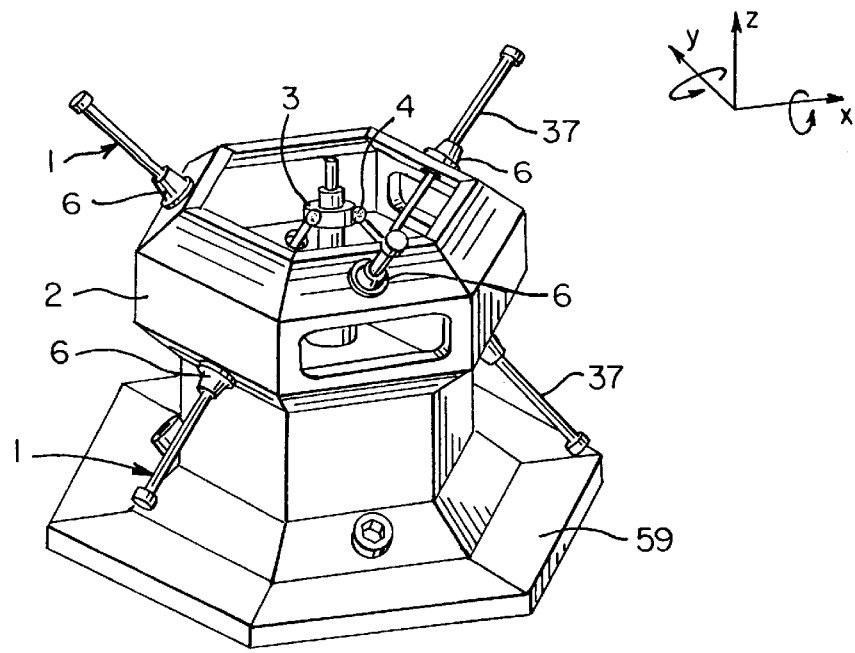
FIG. 25 a perspective representation of a further embodiment of the inventive device.
Figure 26:
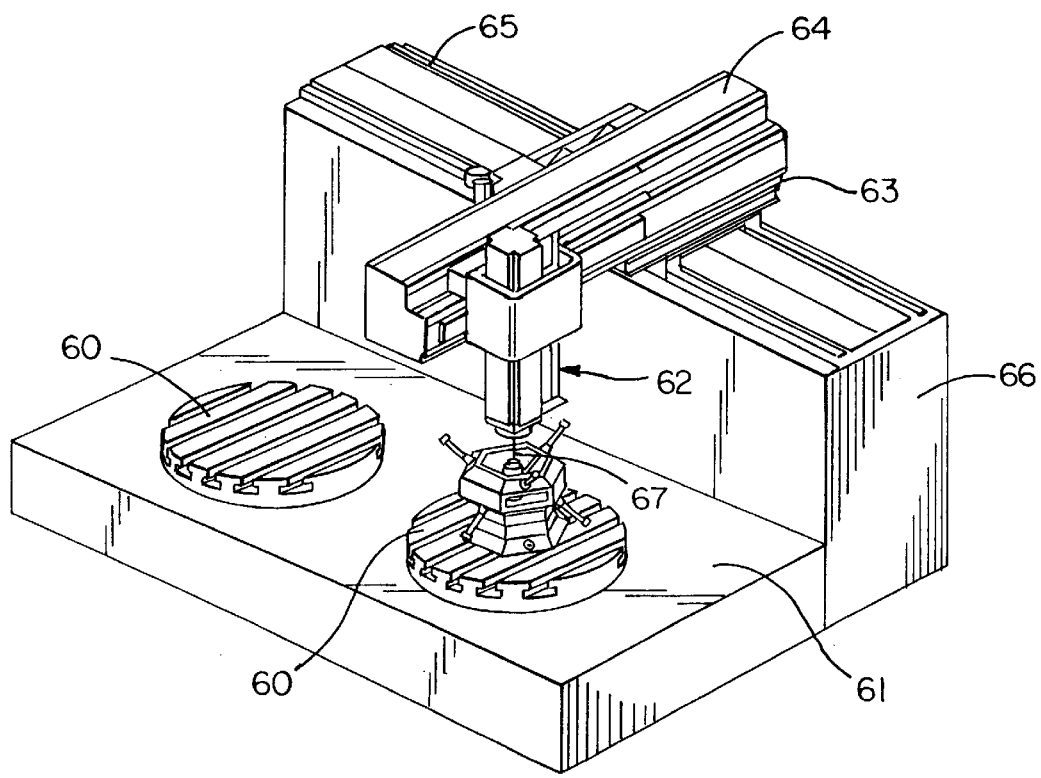
FIG. 26 a perspective representation of a device according to FIG. 25 together with a measuring device.

FIGS. 25 and 26 show a device which is embodied as a measuring device and which is used for measuring the path and position of the base member 3. It is arranged within the frame 2 and has at least one receiving element in the form of a mandrel, a tool interface etc. Such mandrels, tool interfaces etc. are provided at the base members of the aforementioned embodiments in the same manner. The frame structure 2 is of identical design as the embodiment according to FIGS. 1 through 4. The devices 1 are pivotably connected at the base member 3 by connecting members 4 as has been explained in connection with the other embodiments. The devices 1 are also coupled by connecting members 6 in the aforedescribed manner to the frame structure 2. The devices 1 have connecting rods 37 which in the aforedescribed manner are axially displacable so that their effective length between the base member 3 and the frame structure 2 can be lengthened or shortened. Each device 1 is freely pivotable by connecting member 4 relative to the base member 3. Via the connecting members 6 the devices 1 are also pivotable relative to the frame structure 2.

The frame structure 2 is positioned on a support device 59 with which the device is mounted, for example, on a table 60 (FIG. 26) by a non-represented clamping device. In the embodiment according to FIG. 26 two adjacently positioned tables 60 are provided which are arranged on a bed 61.

In order to be able to measure the position and/or the path movement of the base member 3, a measuring device 62 is provided with which the effective lengths of the connecting rods 37 of the devices 1, measured between the connecting members 4 at the base member 3 and the frame structure 2, are detected. The connecting rods 37 of the devices 1 are under a defined tension load in the longitudinal direction as disclosed above so that the position of the base member 3 relative to the frame structure 2 can be exactly calculated by the correspondingly measured lengths of the connecting rods 37 of the devices 1 in a spatial arrangement of up to six degrees of freedom with high precision. The measuring device 62 is supported in a guide 63 for continuous adjustment in the z-direction. It is movable in the y-direction along a carriage 64 which is adjustable itself on a guide path 65 in the x-direction. It is positioned at the upper side of a vertically arranged frame part 66 that is adjacent to the bed 61. The measuring device 62 can be adjusted in any suitable position relative to the device, respectively, to its base member 3 so that the lengths of the connecting rods 37 of the devices 1 can be measured simply and precisely. The measuring device 62 is provided with a respective measuring element 67. The present invention is, of course, in no way restricted to the specific disclosure of the specification and drawings, but also encompasses any modifications within the scope of the appended claims.

We claim:

1. A device for numerically controlled (NC) manufacturing, manipulating and measuring apparatuses, said device comprising:

a frame structure (2) having peripherally arranged force-introduction locations;

at least one movement unit (3) having peripherally arranged force-introduction locations;

at least three adjusting devices (1) each comprising a first and a second part;

each one of said three adjusting devices having a first connecting member (4) and a second connecting member (6) positioned at a spacing to said first connecting member (4);

wherein said first parts are connected by said first connecting members (4) to said force introduction locations of said movement unit (3), wherein said force introduction locations of said movement unit (3) are positioned in a first imaginary coupling plane (5) of said movement unit (3);

wherein said first parts are connected by said second connecting members (6) to said force introduction locations of said frame structure (2), wherein said force introduction locations of said frame structure (2) are positioned in a first imaginary coupling plane (7) of said frame structure (2);

wherein said second parts are connected by said first connecting members (4) to said movement unit (3), wherein said first connecting members (4) are positioned in a second imaginary coupling plane (8) of said movement unit (3);

wherein said second parts are connected by said second connecting members (6) to said frame structure (2), wherein said second connecting members (6) are positioned in a second imaginary coupling plane (9) of said frame structure (2);

wherein at least one of said second coupling planes (8, 9) has a fixed spacing to said first coupling planes (5, 7) such that said at least three adjusting devices (1), in standstill positions and during path movement of said movement unit (3) by correspondingly calculated and adjusted lengthening or shortening thereof, are at all times under a defined tension load.

2. A device according to claim 1, wherein said first parts extend along sides of a first imaginary tetrahedron to said second connecting members (6).

3. A device according to claim 1, wherein said second parts extend along the sides of a second imaginary tetrahedron to said second connecting member (6).

4. A device according to claim 1, wherein said second imaginary coupling planes (8, 9) of said movement unit (3) and of said frame structure (2) are rotated relative to said first imaginary coupling planes (5, 7) of said movement unit (3) and said frame structure (2).

5. A device according to claim 1, wherein said first connecting members (4) at said movement unit (3) have an angular distance of 120° relative to one another.

6. A device according to claim 1, the second connecting members (6) of the frame structure (2) have an angular spacing of 120° relative to one another.

7. A device according to claim 6, wherein said second imaginary coupling planes (8, 9) of said movement unit (3) and of said frame structure (2) are rotated by 60° relative to said first imaginary coupling planes (5, 7) of said movement unit (3) and said frame structure (2) relative to a main axis (10) of said movement unit (3).

8. A device according to claim 1, wherein said second imaginary coupling plane (9) of said frame structure (2) has a fixed spacing to said first imaginary coupling plane (7) of said frame structure (2).

9. A device according to claim 1, wherein said first and said second imaginary coupling planes (7, 9) of said frame structure (2) coincide.

10. A device according to claim 1, wherein said first imaginary coupling plane (5) of said movement unit (3) has a fixed spacing to said second imaginary coupling plane (8) of said movement unit (3).

11. A device according to claim 1, wherein said first and said second imaginary coupling planes (5, 8) of said movement device (3) coincide.

12. A device according to claim 1, further comprising an additional adjusting device (15) for a torque support of said movement unit (3), wherein said additional adjusting device (15) has a first additional connecting member (4) and a second additional connecting members (6) and is coupled by said first additional connecting member (4) to a circumference of said movement unit (3) and is pivotably connected by said second additional connecting member (6) at said frame structure (2).

13. A device according to claim 1, wherein said movement unit (3) has interfaces (16) for receiving tools (14), operating devices (17), units (18), manipulators (31) etc.

14. A device according to claim 1, wherein said movement unit (3) comprises additional axis units (18).

15. A device according to claim 1, wherein said frame structure (2) is a frame.

16. A device according to claim 1, wherein said frame structure (2) has a polygonal cross-section.

17. A device according to claim 1, wherein said frame structure (2) has a frame part (21) to which at least one further frame part (22) is connected at one end face.

18. A device according to claim 17, wherein said further frame part (22) has a tapering cross-section in said direction of said free end face.

19. A device according to claim 17, wherein said second connecting members (6) of said adjusting devices (1) are supported at said further frame part (22).

20. A device according to claim 18, wherein a slant angle (24) of said further frame part (22) determined by said cross-sectional tapering is selected as a function of a spatial angle (25) of said adjusting devices (1) in a neutral position of said movement unit (3).

21. A device according to claim 1, wherein said frame structure (2) encloses an interior chamber (19) in which said movement unit (3) is at least partially positioned.

22. A device according to claim 1, wherein said device is a mobile device which is provided with interfaces for controlling/governing at least said adjusting devices (1) and said movement unit (3).

23. A device according to claim 1, wherein said first and/or second connecting members (4, 6) are embodied so as to be moment-free.

24. A device according to claim 1, wherein said first and/or second connecting members (4, 6) are ball elements or U-joints.

25. A device according to claim 1, wherein said adjusting device (1) comprises a connecting rod (37) and a drive (27), wherein said drive (27) moves said connecting rod (37) in its longitudinal direction relative to said frame structure (2).

26. A device according to claim 25, wherein said drive (27) is supported at said frame structure (2).

27. A device according to claim 25, wherein said drive (27) operates mechanically, electromechanically, hydraulically, or pneumatically.

28. A device according to claim 1, further comprising a spindle unit (29) connected to said movement unit (3).

29. A device according to claim 28, wherein said spindle unit (29) has a receiving unit for said tool (14).

30. A device according to claim 1, further comprising a beam guiding device (30) connected to said movement unit (30) for positioning an energy-rich beam.

31. A device according to claim 30, wherein said energy-rich beam is a laser beam.

32. A device according to claim 1, further comprising at least one table (13) for receiving a workpiece (28) or an object.

33. A device according to claim 32, wherein said table (13) is supported on a base frame (11, 12).

34. A device according to claim 33, wherein said base frame (11, 12) comprises columns (11) and wherein said columns (11, 12) support said device.

35. A device according to claim 33, further comprising at least one magazine (54) for tools (14), tool heads, and measuring devices, wherein said at least one magazine (54) is supported at said base frame (11, 12).

36. A device according to claim 35, wherein said at least one magazine (54) has a changer.

37. A device according to claim 32, wherein said table (13) is rotatable about at least one axis of rotation (34).

38. A device according to claim 37, wherein said at least one axis of rotation (34) extends through said table (13).

39. A device according to claim 37, wherein said table (13) has at least one NC axis (35).

40. A device according to claim 1, wherein said device is positioned in a feed area of at least one transport system (33).

41. A device according to claim 1, wherein said frame structure (2) is arranged horizontally.

42. A device according to claim 1, wherein said frame structure (2) is arranged at a slant relative to a horizontal orientation.

43. A device according to claim 1, wherein least two said devices are connected to one another.

44. A device according to claim 43, further comprising intermediate supports (57), wherein said devices are connected to one another by said intermediate supports.

45. A device according to claim 44, wherein said intermediate support (57) connects said frame structures (2) of said devices arranged adjacent to one another.

46. A device according to claim 1, further comprising a base support (58), wherein at least two of said devices are connected to said base support (58).

47. A device according to claim 46, said base support (58) is connected by a further intermediate support (57) with said frame structures (2) of said devices.

48. A device according to claim 1, wherein at least two units, comprised of at least two of said devices, are interconnected.

49. A device according to claim 1, further comprising a measuring device for detecting a position of said movement unit (3) during standstill as well as during movements along said path.

* * * * *